United States Patent
Swank, II

(10) Patent No.: US 10,967,695 B2
(45) Date of Patent: Apr. 6, 2021

(54) STEERABLE SUSPENSION SYSTEM

(71) Applicant: BLUELINE MFG. CO., Moxee, WA (US)

(72) Inventor: Charles E. Swank, II, Yakima, WA (US)

(73) Assignee: Blueline Mfg., Co., Moxee, WA (US)

( * ) Notice: Subject to any disclaimer, the term of this patent is extended or adjusted under 35 U.S.C. 154(b) by 0 days.

(21) Appl. No.: 16/290,843

(22) Filed: Mar. 1, 2019

(65) Prior Publication Data

US 2019/0270356 A1 Sep. 5, 2019

Related U.S. Application Data

(60) Provisional application No. 62/638,006, filed on Mar. 2, 2018.

(51) Int. Cl.
*B60G 3/20* (2006.01)
*B62D 9/00* (2006.01)
(Continued)

(52) U.S. Cl.
CPC ............. *B60G 3/207* (2013.01); *B60G 13/00* (2013.01); *B62D 7/142* (2013.01); *B62D 9/00* (2013.01); *B62D 17/00* (2013.01); *B60G 2200/13* (2013.01); *B60G 2200/422* (2013.01); *B60G 2200/44* (2013.01); *B60G 2204/1302* (2013.01); *B60G 2204/143* (2013.01); *B60G 2206/121* (2013.01); *B60G 2206/50* (2013.01); *B60G 2300/02* (2013.01); *B60G 2300/08* (2013.01);
(Continued)

(58) Field of Classification Search
CPC .................... B60G 3/207; B60G 13/00; B60G 2204/1302; B60G 2200/422; B60G 2206/50; B60G 2300/37; B60G 2800/01; B60G 2300/08; B62D 7/142; B62D 9/00; B62D 17/00
USPC ................................................... 280/124.126
See application file for complete search history.

(56) References Cited

U.S. PATENT DOCUMENTS 4,139,065 A * 2/1979 Lewison ................. A01B 63/22
172/400
5,577,759 A * 11/1996 Harris ...................... B60G 9/00
280/124.116
(Continued)

FOREIGN PATENT DOCUMENTS

| CA | 1233844 A | * | 3/1988 | ............ B60G 13/00 |
| EP | 3216631 A1 | * | 9/2017 | ............ B60G 11/28 |
| EP | 3318430 A1 | * | 5/2018 | ............... B60G 3/12 |

*Primary Examiner* — Paul N Dickson
*Assistant Examiner* — Kurtis Nielson
(74) *Attorney, Agent, or Firm* — Svendsen Legal, LLC

(57) ABSTRACT

A steerable suspension system for a vehicle, especially useful in a self-propelled vehicle that can include a worker-platform and optionally include pick-up, transport, and delivery apparatus for produce bins. The steerable suspension system includes independent pairs of parallel arms, each pair coupled to a single steerable drive-wheel, serving as both a suspension and as a shock absorber, with the parallel-acting pair of arms maintaining the steering-leg in its substantially vertical position relative to a ground surface. This steerable suspension system aids the steerable movement and suspension of the vehicle, while increasing safety and maneuverability, and helps to reduce the number of workers required to operate the vehicle.

8 Claims, 7 Drawing Sheets

(51) Int. Cl.
*B62D 17/00* (2006.01)
*B60G 13/00* (2006.01)
*B62D 7/14* (2006.01)

(52) U.S. Cl.
CPC ...... *B60G 2300/37* (2013.01); *B60G 2800/01* (2013.01)

(56) References Cited

U.S. PATENT DOCUMENTS

| | | | | |
|---|---|---|---|---|
| 6,371,237 | B1* | 4/2002 | Schaffer | B60G 11/28 180/253 |
| 8,534,686 | B1* | 9/2013 | Slawson | B60G 11/27 280/124.145 |
| 2003/0005677 | A1* | 1/2003 | Oka | A01D 34/661 56/229 |
| 2009/0224501 | A1* | 9/2009 | Carlson | B60G 9/02 280/124.1 |
| 2014/0251710 | A1* | 9/2014 | Juan | B60G 11/16 180/218 |
| 2016/0075200 | A1* | 3/2016 | Hansen | B60G 7/001 180/55 |
| 2016/0140861 | A1* | 5/2016 | Tischer | B60G 3/20 434/69 |
| 2020/0062064 | A1* | 2/2020 | Riedel | B62D 7/06 |

* cited by examiner

STEERABLE SUSPENSION SYSTEM

TECHNICAL FIELD

An apparatus and system of a steerable suspension, especially useful in a self-propelled vehicle, which can include a worker-platform. More specifically, the steerable suspension system includes a parallel-lever suspension with a steerable drive-wheel attached to the parallel-lever suspension.

BACKGROUND OF THE INVENTION

Trailers and tractors are widely employed on farms, orchards and work-sites to perform needed tasks, often related to the planting, cultivating, maintaining and harvesting of produce. Tractors may tow or otherwise pull a variety of implements, including trailers, lifts, and other non-propelled vehicles. Self-powered vehicles, including trailers, lifts and platforms are used more commonly, as mechanization and higher density planting lends to or requires smaller and more specialized vehicles in the field or orchard. These self-powered vehicles conventionally require an operator or driver to steer and maneuver the vehicle, and avoid obstacles, typically in navigating through an orchard, vineyard, farm or hop yard, construction site or work site.

The problem of rising labor costs coupled with the unavailability of skilled workers pushes the agricultural industry to develop solutions that often utilize technological improvements to reduce the skilled labor required to accomplish the tasks required to manage and operate a farm or orchard. Platforms are desirable in many agricultural endeavors, where workers must access heights, normally accessible only with ladders. Mobile worker-platforms are useful for such tasks, and lifting or elevated platforms are gaining in popularity, many employing 'scissor lifts,' or personal 'cherry-picker' styles of mechanisms, to elevate the worker to higher points above ground, out of the normal reach of a worker standing on the ground surface.

In the field or workplace, any new mechanism or apparatus that serves well in aiding the movement and suspension of a self-powered platform, or more broadly any self-powered or self-propelled vehicle, with new features that increase the safety and maneuverability of such vehicles and possibly reduce the number of workers required to operate the self-powered vehicle, would be desirable. The following is a disclosure of preferred embodiments of a steerable suspension system especially useful in a self-propelled vehicle. The present invention will be understood by reference to the following detailed description taken in conjunction with the accompanying drawings.

Figure 1:
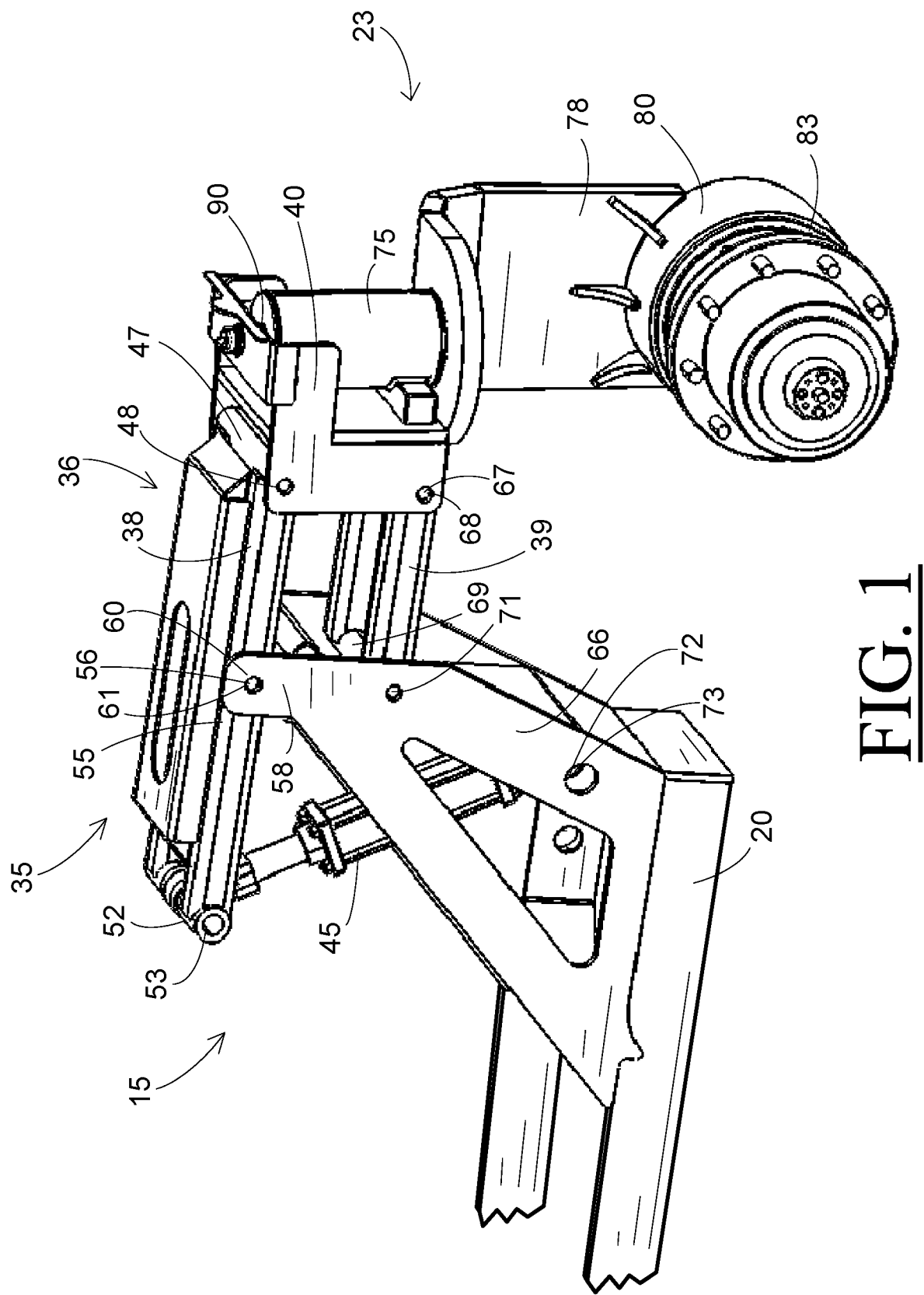
FIG. 1 is a perspective view of a portion of a steerable suspension system, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

Figure 3:
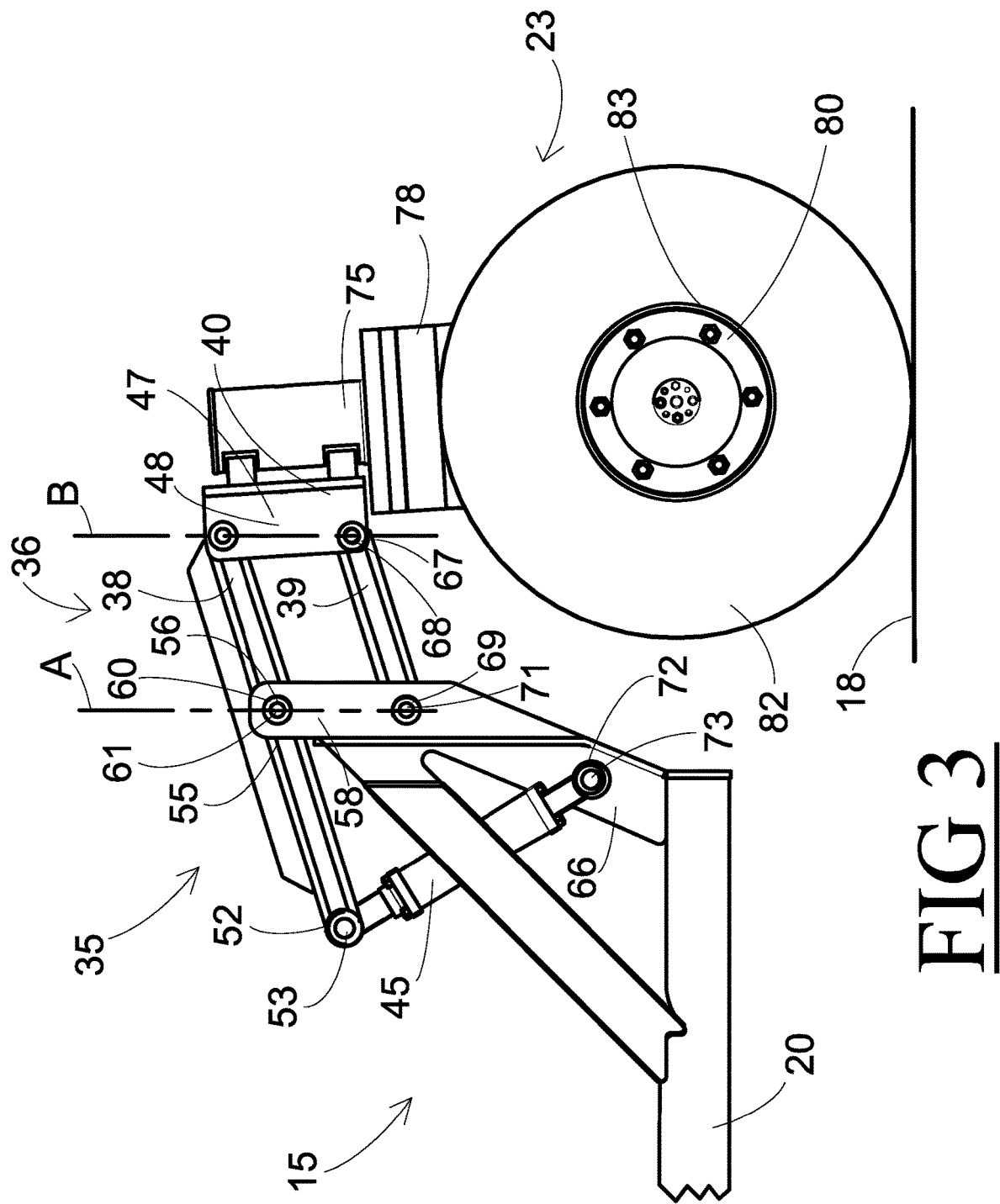
FIG. 3 is a side view of a portion of the steerable suspension system, according to an embodiment of the invention.
Figure 4:
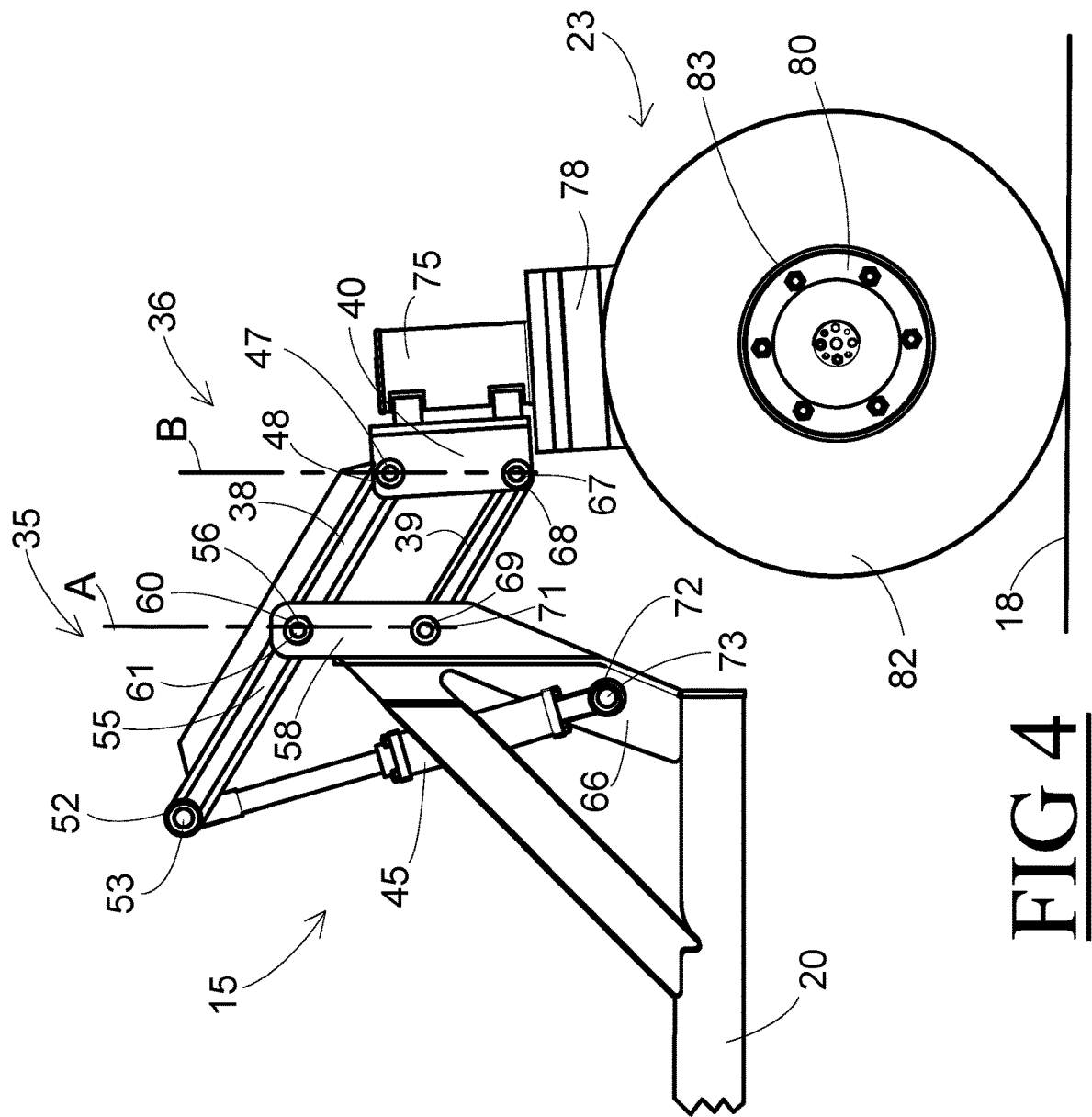
FIG. 4 is a side view of a portion of the steerable suspension system, according to an embodiment of the invention.
Figure 5:
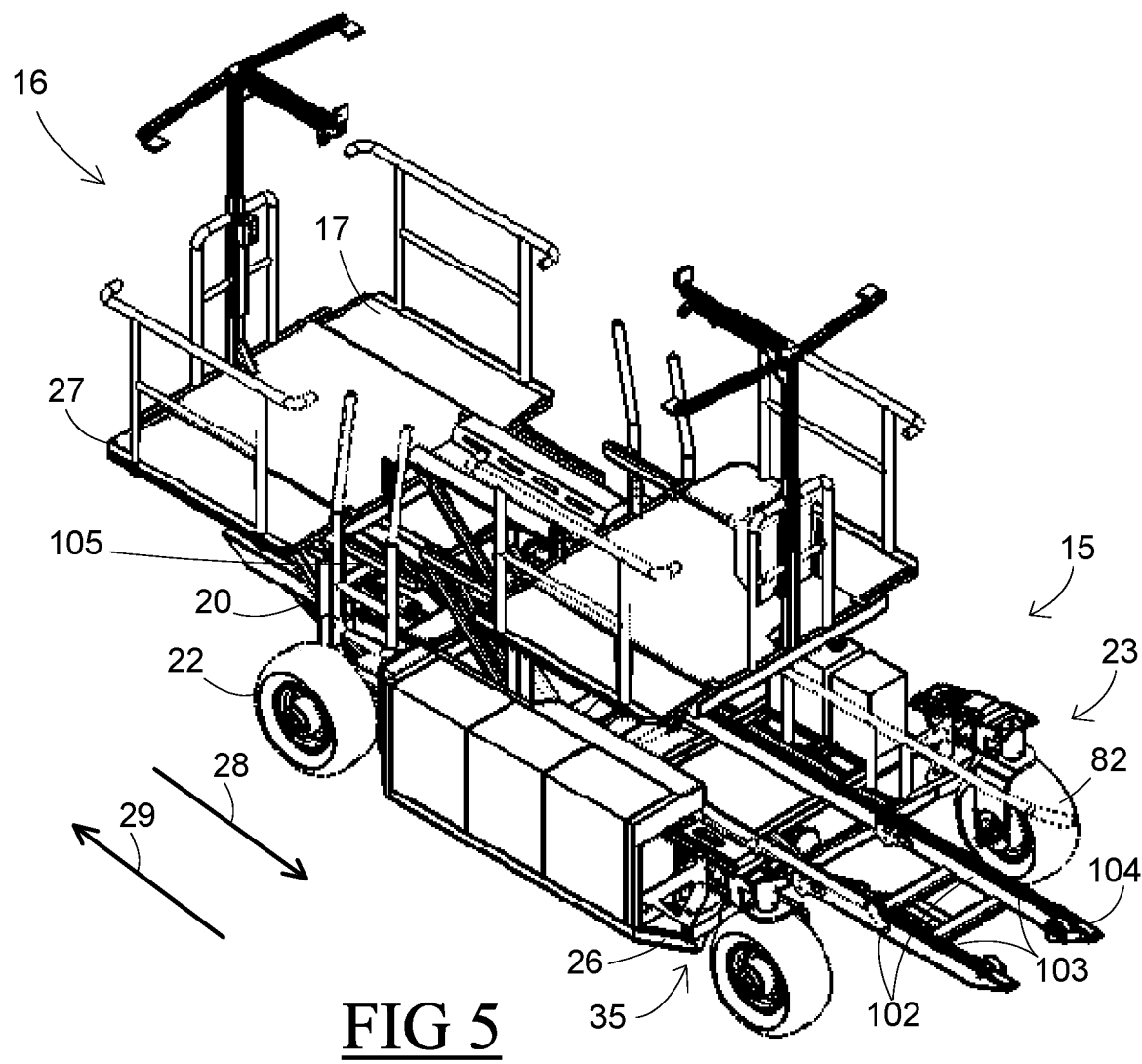
FIG. 5 is a perspective view of a self-propelled vehicle that includes the steerable suspension system, according to an embodiment of the invention.
Figure 6:
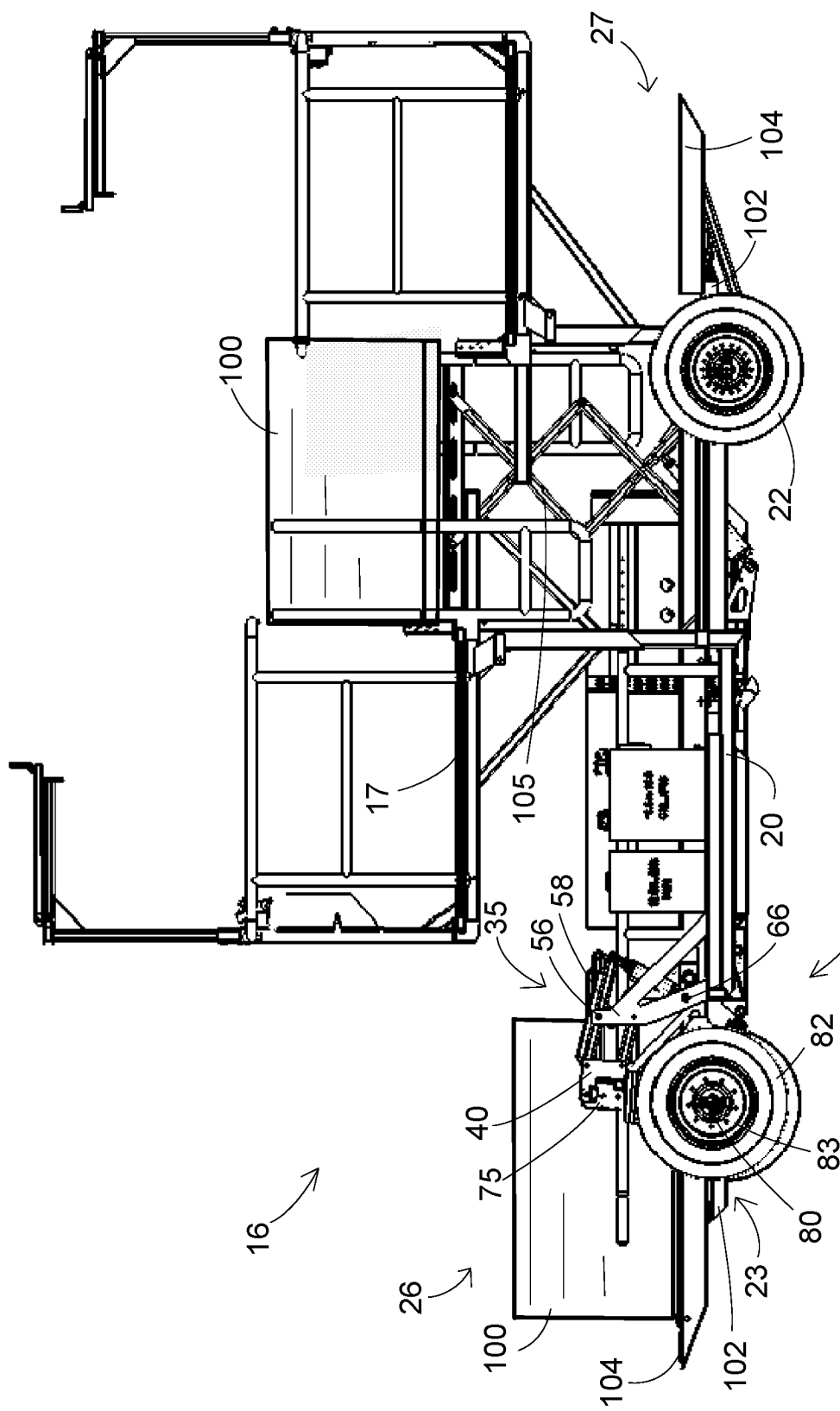
FIG. 6 is a side view of a self-propelled vehicle that includes the steerable suspension system, according to an embodiment of the invention.
Figure 7:
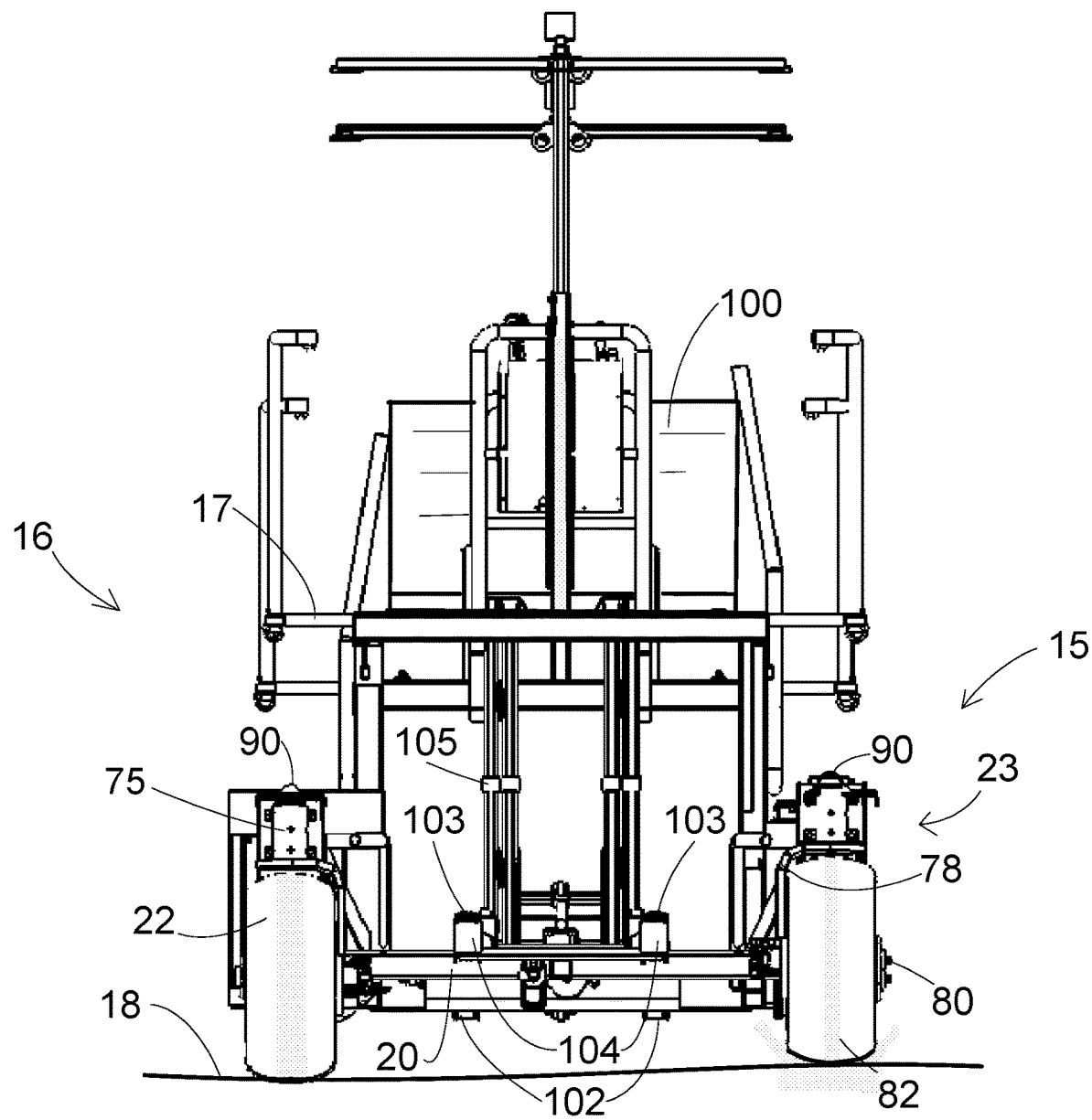
FIG. 7 is a front view of a self-propelled vehicle that includes the steerable suspension system, according to an embodiment of the invention.

The present invention provides a steerable suspension system. FIGS. 1 through 7 show a preferred embodiment of the steerable suspension system 15, especially useful in a self-propelled vehicle 16. As shown in FIGS. 5, 6 and 7, a preferred embodiment of the self-propelled vehicle with the steerable suspension system of the present invention can include a worker-platform 17. Worker-platforms are desirable where workers must access heights that are normally accessible only with ladders. Mobile worker-platforms are useful for tasks requiring access above the reach of a typical worker, standing on a ground surface 18. Worker-platforms can also include lifting features, with some employing well known 'scissor-lifts,' hydraulically or hydrostatically powered and actuated booms, or 'cherry-picker' types of mechanisms, employed to further elevate the worker or elements of the worker-platform, to access higher elevations relative to the ground surface.

In a preferred embodiment of the steerable suspension system 15 as used in the self-propelled vehicle 16, the self-propelled vehicle includes a main-frame 20 that supports the worker-platform 17, as shown in FIGS. 5 through 7. Preferably, a multiple of wheels 22 mount to the main-frame, which can be referred to collectively as "the wheels," with one or more of the multiple of wheels is steerable and includes a drive or propulsion system. Each of these multiple of wheels specifically can be referred to as a steerable drive-wheel 23. As also shown in FIG. 5, the self-propelled vehicle has a frontward end 26 opposite a rearward end 27, with the self-propelled vehicle configured to travel primarily in a frontward direction 28, but preferably to also be able to reverse direction if need, and travel in a rearward direction 29. In the field or workplace, the self-propelled vehicle can be any mechanism or apparatus that serves well in aiding the movement and suspension of a self-powered platform, or more broadly any vehicle that is self-powered or self-propelled.

In the preferred embodiment shown in FIG. 5, the self-propelled vehicle 16 has four wheels that comprise the multiple of wheels 22. Preferably, two of the wheels mount to the main-frame 20 opposite each other and proximate to the frontward end 26 of the self-propelled vehicle, and two of the wheels mount opposite each other and proximate to the rearward end 27 of the self-propelled vehicle.

Most preferably, the wheels at the frontward end 26 of the self-propelled vehicle 16 are each a steerable drive-wheel 23. In the most preferred embodiment of present invention, each steerable drive-wheel is attached to the main-frame 20 of the self-propelled vehicle 16 with the use of a parallel-lever suspension 35, as shown in FIG. 1. Each steerable drive-wheel is independently coupled with the parallel-lever suspension components of the steerable suspension system 15.

Figure 2:
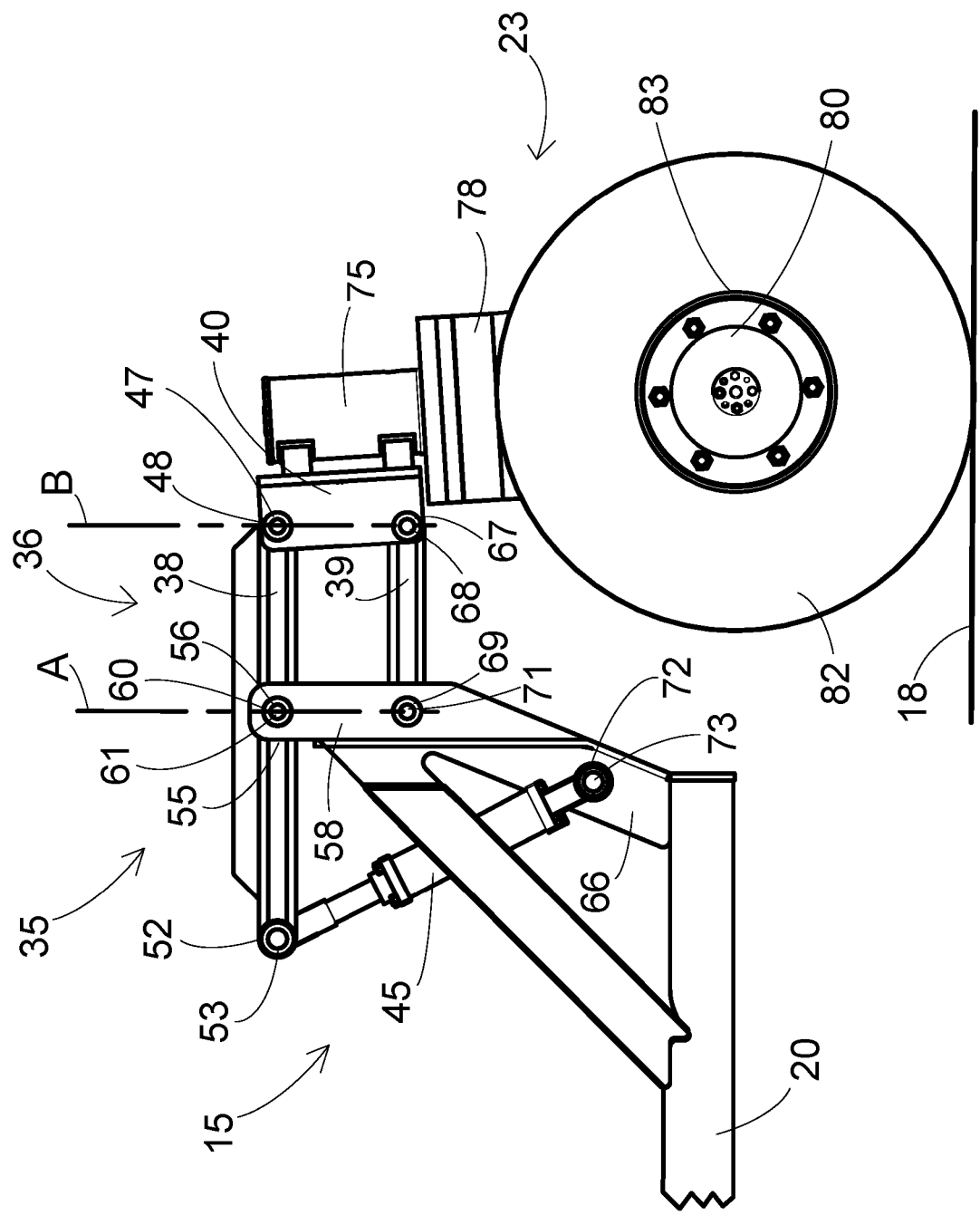
FIG. 2 is a side view of a portion of the steerable suspension system, according to an embodiment of the invention.

The parallel-lever suspension 35 of the steerable suspension system 15 includes a parallel-acting pair of arms 36. The parallel-acting pair of arms includes an upper lever-arm 38, and a lower link-arm 39. The upper lever-arm connects a cross-head 40 to a suspension-strut 45. Specifically, the upper lever-arm includes a lever-arm head-bearing 47, and the cross-head includes an upper head lever-pivot 48 for receiving the lever-arm head-bearing, as shown in FIGS. 2 through 4. Also, the upper lever-arm includes a lever-arm strut-bearing 52, with the suspension strut including a strut lever-pivot 53 for receiving the lever-arm strut-bearing of the upper lever-arm.

The upper lever-arm 38 has a mid-section 55 between the upper head lever-pivot 48 and the lever-arm strut-bearing 52. Most preferably, the upper lever-arm in the parallel-lever suspension 35 of the steerable suspension system 15 includes a fulcrum 56 positioned at a hinging connection between the mid-section of the upper lever-arm and a cross-base 58. As shown in FIG. 1, in a preferred embodiment of the parallel-lever suspension 35 of the steerable suspension system 15, the fulcrum includes a fulcrum-bearing 60 received into a fulcrum-pivot 61.

Most preferably, as detailed in FIGS. 2 through 4, the fulcrum-pivot 61 of the fulcrum 56 is positioned on the cross-base 58, and the fulcrum-bearing 60 of the fulcrum is positioned proximate to the mid-section 55 of the upper lever-arm 38. As shown in FIG. 6, the cross-base extends from a base-frame 66, with the base frame extending from the main-frame 20 of the self-propelled vehicle 16. Alternatively, the cross-base may mount directly to the main-frame. The upper lever-arm 38 extends from the upper head lever-pivot 48, past the upper lever-arm's fulcrum-bearing 60, to the lever-arm strut-bearing 52. And so, the upper lever-arm 38 hingeably connects the cross-head 40 to the suspension-strut 45, across the fulcrum-pivot 61 of the cross-base 58.

The lower link-arm 39 operates in a parallel action with the upper lever-arm 38 in the parallel-lever suspension 35 of the steerable suspension system 15, with the lower link-arm hingably connecting the cross-head 40 to the cross-base 58. Specifically, the lower link-arm includes a link-arm head-bearing 67, and the cross-head includes a lower head link-pivot 68 for receiving the link-arm head-bearing of the lower link-arm, as shown in FIGS. 2 through 4. Also, the lower link-arm includes a link-arm base-bearing 69, with the cross-base including a lower base link-pivot 71 for receiving the link-arm base-bearing of the lower link-arm.

Preferably, the suspension strut 45 of the steerable suspension system 15 includes a base strut-bearing 72 that mounts to the base-frame 66 at a base strut-pivot 73, again noting that most preferably, the base-frame is an extension of the main-frame 20, as shown in FIGS. 2 through 4, and 6. More simply, the base-frame may be considered as part of the main-frame. As described above, the suspension-strut also includes a strut lever-pivot 53 for receiving the lever-arm strut-bearing 52 of the upper lever-arm 38.

Most preferably, the suspension-strut 45 is a conventional hydraulic 'piston-and-cylinder' type of actuator, as is well-known and typically employed in mechanical devices requiring dampeners or actuators. The power and stroke distance of the suspension strut is selected to suit the specific requirements of the steerable suspension system 15 as designed, and to fit the requirements of the parallel-lever suspension 35 for use in the present invention. For a preferred embodiment, a most preferred suspension strut is a model number 205H06-112 (2 inch bore and 6 inch stroke) hydraulic cylinder, as manufactured by the Spencer Fluid Power Co., of Kent, Wash., US.

Additionally, it is well considered that instead of the preferred hydrostatic system, the steerable suspension system 15 of the present invention could employ an electric 'servo,' or electric motor actuation system, or possibly a pneumatic actuation system in the alternative.

The cross-head 40 of the steerable suspension system 15 includes a steering-actuator 75. The steering-actuator receives a steering-leg 78, as shown in FIGS. 2 through 4. The steering-actuator is mounted immovably upon the cross-head 40, so that the steering-leg is rotated as the steering-actuator operates. The steering actuator is most preferably a 'sliding-spline,' or alternatively a 'worm-drive' type of hydrostatic actuator, which is able to turn the steering-leg and the attached wheel-hub with powerful and steady precision. A most preferred steering actuator is a L20 Series Rotary Actuator model number L20-8.2-E-FT-180-S1-O-H, as manufactured by the HELAC Corp., of Enumclaw, Wash., US.

The steering-leg 78 functions as a bracket for the steerable drive-wheel 23, with the steerable drive-wheel mounted to the steering leg as shown in FIG. 1. The steerable drive-wheel includes a wheel-hub 80 with a conventional tire 82 and tire-rim 83 mounted to the wheel-hub, as shown in FIGS. 2 through 4. The wheel-hub is most preferably a hydrostatic motor, powered and configured to operate without a conventional axle connection between paired wheels, across the self-propelled vehicle 16. A most preferred wheel-hub is a W1BFF R3022 KH3775 model of Torque-Hub' brand of hydrostatic motor hub, as manufactured by Oerlikon Fairfield, of Lafayette, Ind., US.

As shown in FIGS. 1 and 7, the steerable suspension system 15 includes an angle-sensor 90 located proximate to the steering-actuator 75. Preferably, the angle sensor is a solid state type of magnetic sensor, selectable by a person skilled in angle-sensor technology. Most preferably, the angle-sensor for each steering-actuator serving each steerable drive wheel 23 of the multiple of wheels 22, with each steerable drive wheel mechanically independent of the other wheels, in that no mechanical steering linkages between any of the steerable drive wheels are required to operate the steerable suspension system. With the sensor control signal output from the angle-sensor at each steerable wheel, the steering-actuator can be programmed to compensate for the difference in turning arcs for each wheel, as needed to best turn the self-propelled vehicle 16 in the desired direction, with a minimum of skidding or binding of the steerable drive wheels.

The suspension-strut 45 of the steerable suspension system 15 can function as both a suspension actuator and as a shock absorber. The suspension-strut can raise and lower the steering-leg 78 with its attached wheel-hub 80, to level the main-frame 20 of the self-propelled vehicle 16, and absorb shocks or impacts upon the steerable drive-wheel 23, as encountered when the self-propelled vehicle travels along a ground surface 18 that is uneven or not level.

Uniquely, the steerable suspension system 15 is able to steer each steerable drive-wheel 23 while raising, lowering, or dampening the steerable drive-wheel, as desired. In the operation of the parallel-lever suspension 35 of the steerable suspension system, the parallel-acting pair of arms 36 serve to maintain the steering-leg 78 in a substantially vertical position relative to the ground surface 18. Specifically, a cross-baseline "A" can be constructed by drawing a line from the fulcrum-pivot 61 through the upper head lever-pivot 48, as shown in FIGS. 2 through 4. Similarly, a cross-headline "B" can be constructed by drawing a line from the upper head lever-pivot 48 to the lower head link-pivot 68, as also shown in FIGS. 2 through 4.

For the parallel-lever suspension 35 of the steerable suspension system 15, the fulcrum-bearing 60 of the upper lever-arm 38 hinges about the fulcrum-pivot 61 of the fulcrum 56, to either raise or lower the cross-head 40 in relation to the cross-base 58. The lower link-arm 39 serves to maintain the cross-baseline A in a parallel relation to the cross-headline B, keeping the upper lever-arm substantially parallel to the lower link-arm, and thereby maintaining the steering-leg 78 in a substantially vertical position relative to the ground surface 18, as shown in FIGS. 2 through 4.

The suspension strut 45 dampens the up and down action of the steerable drive-wheel 23 connected to the parallel-lever suspension 35, while also determining the height of the steerable drive-wheel relative to the main-frame 20. The steering-actuator 75 on the cross-head, which is also connected to the parallel-lever suspension, is able to turn or steer the steering-leg 78 with its attached wheel-hub 80. This steerable suspension system 15 serves well in aiding the movement and suspension of the self-propelled vehicle 16, and increases the safety and maneuverability of the vehicle, and helps to reduce the number of workers required to operate the self-propelled vehicle 16.

In addition to absorbing bumps, shocks, and compensating for a ground surface 18 that is uneven, the main-frame 20 of the self-propelled vehicle 16 equipped with the steerable suspension system 15, can be raised, tilted, or lowered as desired, with use of the suspension-strut 45 and associated parallel-lever suspension 35 at each steerable drive-wheel 23. This feature is very useful in the pick-up, delivery, or retrieval of one or more of a bin 100, as shown in FIGS. 6 and 7, and also useful when the self-propelled vehicle is operating on an incline, or a tilted ground surface and it is desirable to maintain the worker-platform 17 at a level pitch, for worker comfort and safety.

In an alternative embodiment of the steerable suspension system 15, all four of the multiple of wheels 22 can be a steerable drive wheel 23, coupled with the parallel-lever suspension 35, and most preferably each wheel is mechanically independent of the other wheels. Each steerable drive wheel can include a suspension-strut 45 and associated parallel-lever suspension 35. Also, each steerable drive wheel would include its own steering-actuator 75, steering-leg 78 and wheel-hub 80 with tire-rim 83 and tire 82, without any mechanical steering or power transfer linkages between any two or more of the steerable drive wheels.

In a preferred embodiment of the self-propelled vehicle 16 with the steerable suspension system 15 of the present invention, the self-propelled vehicle is especially suited to pick-up and deliver one or more bins 100 from the ground surface 18 or field, as shown in FIGS. 6 and 7. In describing a most preferred embodiment of the present invention, a "field" may be broadly defined as including any agricultural production area or work-site, including orchards, vineyards, groves, patches, or hop yards. Also, the "bin" can be more broadly described, simply as a container.

For use in the delivery or retrieval of a bin 100, or a multiple of bins, the self-propelled vehicle 16 includes a pair of bin-rails 102, which extend from the self-propelled vehicle as shown in FIGS. 5 and 6. The bin-rails attach to the main-frame of the self-propelled vehicle, near the ground surface 18. The bin-rails preferably include a transport-chain 103 that runs either parallel to, or preferably within the bin-rails. The bin-rails terminate with bin-forks 34, as detailed in FIG. 5. When the bin-forks are placed beneath the bin, the transport chain is able to grasp and move the bin along the bin-rails as shown in FIG. 6, in a reward direction or in a forward direction, into or out of the self-propelled vehicle, as desired.

Additionally, a bin-lift 105 can be included within the self-propelled vehicle 16, as shown in FIGS. 6 and 7. Preferably, the bin-lift is a conventional 'scissor-lift' type of mechanism that is able to raise or lower the bin 100 up to, or down from the level of the worker platform 17, from the level of the pair of bin-rails 102, which preferably terminate in the bin-forks 104.

Of note, the terms "substantially," "proximate to" and "approximately" are employed herein throughout, including this detailed description and the attached claims, with the understanding that is denotes a level of exactitude or equivalence in amount or location commensurate with the skill and precision typical for the particular field of endeavor, as applicable.

Additionally, the terms "bearing" and "pivot" are used herein to describe a hinging mechanical connection, well known by those skilled in mechanical actuation or movement, and conventionally having an inner axial element closest to the hinging axis, referred to as a "pivot," and the outer axial element rotating about the pivot referred to as a "bearing." However, it is noted that these elements are interchangeable in many hinging connections. It is considered that persons skilled in the applicable field of mechanical engineering or design would well understand the how a particular bearing and pivot are usually reversible or interchangeable in a hinging connection. Additionally, the terms "bearing" and "pivot" are used herein in one particular way or the other for the purpose of more clearly describing a preferred embodiment of the invention, as employed in the written description and drawings of the present specification.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A steerable suspension system for a vehicle, the system comprising:
   a steerable drive-wheel attached to a main-frame of the vehicle with a parallel-lever suspension, and the parallel-lever suspension including a parallel-acting pair of arms;
   the parallel-acting pair of arms include an upper lever-arm, and a lower link-arm;
   the upper lever-arm hingably connects a cross-head to a suspension-strut, and the upper lever-arm includes a mid-section, the mid-section located between the cross-head and the suspension-strut;
   the lower link-arm hingably connects the cross-head to a cross-base, and the cross-base extends from the main-frame of the vehicle;
   a fulcrum positioned proximate to the mid-section of the upper lever-arm, and the fulcrum pivotably connects the upper lever-arm to the cross-base;
   the suspension strut mounts to the main-frame of the vehicle, and the suspension strut connects to the upper lever-arm;
   the upper lever-arm movable in a parallel action with the lower link-arm, as the upper lever-arm pivots about the fulcrum, and as the cross-head is raised or is lowered in relation to the main-frame;
   the steerable drive-wheel includes a steering-leg, and a steering-actuator connects the steering leg to the cross-head; and
   the vehicle steerable with rotation of the steering-actuator, as the parallel-lever suspension dampens the steerable drive-wheel with the suspension strut.

2. The steerable suspension system for a vehicle of claim 1, wherein:
   the upper lever-arm includes a lever-arm head-bearing, the cross-head includes an upper head lever-pivot, and the upper head lever-pivot receives the lever-arm head-bearing;
   the upper lever-arm includes a lever-arm strut-bearing, and the suspension strut includes a strut lever-pivot, and the strut lever-pivot receives the lever-arm strut-bearing of the upper lever-arm;
   the fulcrum includes a fulcrum pivot and the fulcrum pivot is received into a fulcrum-bearing on the upper lever-arm; and
   the upper lever-arm is in movement in the parallel action with the lower link-arm as the upper lever-arm hinges at the upper head lever-pivot to pivot on the fulcrum bearing, and the movement of the upper lever-arm is dampened by the suspension strut at the lever-arm strut-bearing.

3. The steerable suspension system for a vehicle of claim 1, wherein:
   the lower link-arm includes a link-arm head bearing, the cross-head includes a lower head link-pivot, and the lower head link-pivot receives the link-arm head bearing;
   the lower link-arm includes a link-arm base bearing, the cross-base includes a lower base link-pivot, and the lower base link-pivot receives the link-arm base bearing; and
   the action of the lower link-arm in parallel to the upper link-arm maintains the cross-head in a substantially parallel relation to the cross-base, as the steerable drive-wheel is raised in relation to the main-frame or the steerable drive-wheel is lowered in relation to the main-frame.

4. The steerable suspension system for a vehicle of claim 1, wherein:
   the suspension-strut of the steerable suspension system functions as both a suspension actuator and as a shock absorber, with the suspension-strut acting to raise the steering-leg and to lower the steering-leg with a wheel-hub attached to the steering-leg; and
   the suspension-strut levels the main-frame of the vehicle relative to a ground surface beneath the steerable drive-wheel, and the suspension-strut absorbs a shock or an impact upon the steerable drive-wheel.

5. A steerable suspension for a vehicle, the steerable suspension comprising:
   a steerable drive-wheel connected to a vehicle main-frame with a parallel-acting pair of arms;
   the parallel-acting pair of arms include an upper lever-arm, and a lower link-arm;
   the steerable drive-wheel including a cross-head;
   the upper lever-arm hingably connects to the cross-head at an upper head lever-pivot, and the upper lever-arm hingably connects to a suspension-strut at a strut lever-pivot, and the suspension strut mounts to the vehicle main-frame at a base strut-pivot;
   the upper lever-arm includes a mid-section, the mid-section located between the upper head lever-pivot and the strut lever-pivot;
   the lower link-arm hingably connects the cross-head at a lower head link-pivot, to a cross-base at a lower base link-pivot, and the cross-base extends from the vehicle main-frame;
   a fulcrum positioned proximate to the mid-section of the upper lever-arm, and the fulcrum pivotably connects the upper lever-arm to the cross-base at a fulcrum pivot;
   the upper lever-arm movable in a parallel action with the lower link-arm, as the upper lever-arm pivots about the fulcrum pivot, and as the cross-head is raised or is lowered in relation to the vehicle main-frame;
   the steerable drive-wheel includes a steering-leg, and a steering-actuator connects the steering leg to the cross-head; and
   the vehicle steerable with rotation of the steering-actuator, as the parallel-acting pair of arms dampens the steerable drive-wheel with the suspension strut.

6. The steerable suspension system for a vehicle of claim 5, wherein:
   the upper lever-arm includes a lever-arm head-bearing, and the upper head lever-pivot receives the lever-arm head-bearing;
   the upper lever-arm includes a lever-arm strut-bearing, and the strut lever-pivot receives the lever-arm strut-bearing of the upper lever-arm; and
   the upper lever-arm is in movement in the parallel action with the lower link-arm as the upper lever-arm hinges at the upper head lever-pivot to pivot on the fulcrum bearing, and the movement of the upper lever-arm is dampened by the suspension strut at the lever-arm strut-bearing.

7. The steerable suspension system for a vehicle of claim 5, wherein:
   the lower link-arm includes a link-arm head bearing, and the lower head link-pivot of the cross-head receives the link-arm head bearing;
   the lower link-arm includes a link-arm base bearing, and the lower base link-pivot of the cross-base receives the link-arm base bearing; and
   the action of the lower link-arm in parallel to the upper link-arm maintains the cross-head in a substantially parallel relation to the cross-base, as the steerable drive-wheel is raised in relation to the vehicle main-frame or the steerable drive-wheel is lowered in relation to the vehicle main-frame.

8. The steerable suspension system for a vehicle of claim 5, wherein:
- a cross-baseline defined as a first line from the fulcrum-pivot of the cross-base through the upper head lever-pivot of the cross-base;
- a cross-headline defined as a second line from the upper head lever-pivot of the cross-head to the lower head link-pivot of the cross-head; and
- the parallel-acting pair of arms maintain the steering-leg in a substantially vertical position relative to the ground surface as the steerable drive-wheel is raised in relation to the vehicle main-frame or the steerable drive-wheel is lowered in relation to the vehicle main-frame.

\* \* \* \* \*